United States Patent [19]

Greenhalgh et al.

[11] 4,005,180
[45] Jan. 25, 1977

[54] METHOD FOR PRODUCING SYNTHETIC DIAMONDS

[75] Inventors: Geoffrey Harvey Greenhalgh, Sussex, England; Roger John Wedlake; Pieter Willem Gideon DeJager, both of Johannesburg, both of South Africa

[73] Assignee: De Beers Industrial Diamond Division Limited, South Africa

[22] Filed: Jan. 24, 1975

[21] Appl. No.: 543,871

Related U.S. Application Data

[63] Continuation of Ser. No. 286,678, Sept. 6, 1972, abandoned.

[52] U.S. Cl. ............................................. 423/446
[51] Int. Cl.$^2$ .................... B01J 3/06; C01B 31/06
[58] Field of Search ................... 423/446; 51/307
[56] References Cited

UNITED STATES PATENTS

| | | | |
|---|---|---|---|
| 2,947,609 | 8/1960 | Strong | 423/446 |
| 3,597,158 | 8/1971 | Horton | 423/446 |
| 3,607,060 | 9/1971 | Kuratomi | 423/446 |
| 3,655,340 | 4/1972 | Kuratomi | 423/446 |
| 3,676,069 | 7/1972 | Kennedy | 423/446 |
| 3,711,595 | 1/1973 | Margrave et al. | 423/446 |

OTHER PUBLICATIONS

Wentorf "J. Physical Chemistry" 1/69, No. 9, Sept. 1965, pp. 3063–3069.

*Primary Examiner*—Edward J. Meros
*Assistant Examiner*—Eugene T. Wheelock
*Attorney, Agent, or Firm*—Young & Thompson

[57] ABSTRACT

This invention relates to the synthesis of diamond by subjecting a carbon-containing composition substantially free of carbon-hydrogen covalent bonds to conditions of temperature and pressure such as to cause decomposition of the composition to release carbon atoms or groups of carbon atoms and effect conversion of the released carbon atoms or groups of carbon atoms into diamond. The preferred compositions are halogenated compounds, particularly hexachlorobenzene, hexachloroethane and tetrachloroquinone.

1 Claim, 1 Drawing Figure

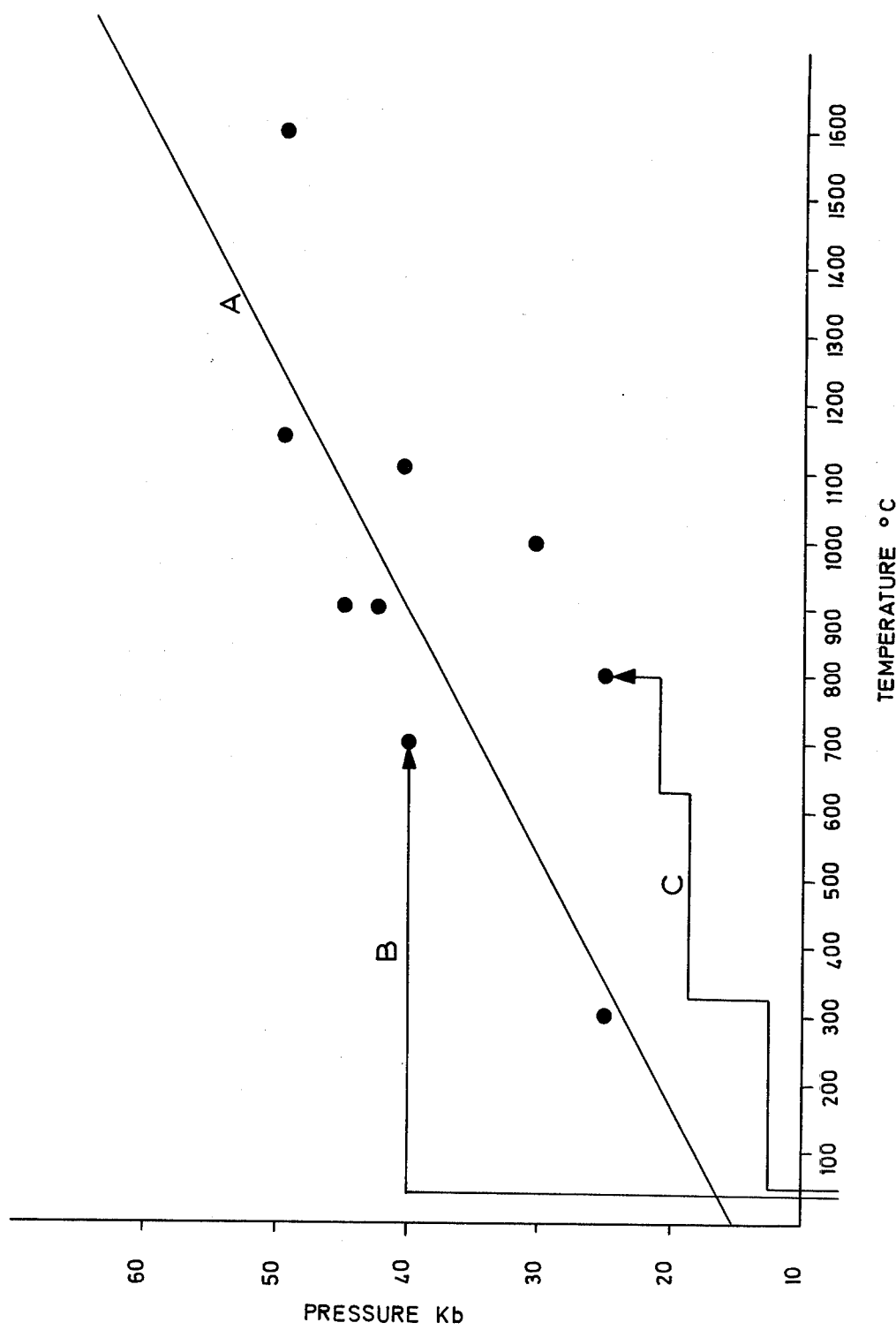

METHOD FOR PRODUCING SYNTHETIC DIAMONDS

This is a continuation, of application Ser. No. 286,678, filed Sept. 6, 1972 now abandoned.

This invention relates to hard materials and is concerned more particularly with diamond synthesis.

Diamond has in the past been produced synthetically by subjecting a carbonaceous material such as graphite or amorphous carbon to pressures and temperatures in the diamond stable region, i.e. conditions under which diamond is the stable allotrope of carbon, in the presence of metal selected from the group of iron, cobalt, nickel ruthenium, rhodium, palladium, osmium, iridium, platinum, chromium, tantalum and manganese or alloy containing one or more of these metals. It has not been determined with certainty what function the metal or alloy performs in the conversion, but it is generally accepted that the metal or alloy acts as a catalyst or solvent. In this specification, the term "conventional metallic solvents for carbon" will be used to describe these metals and alloys.

Very high pressures and temperatures are required to effect the conversion of non-diamond carbon into diamond. When a conventional metallic solvent is used in the conversion, pressures in excess of 55 kilobars and temperatures in the range 1200° to 2500° C are required and reference in this regard may be made to U.S. Pat. No. 2,947,609 granted to Herbert M. Strong and assigned to the General Electric Company.

Any one of a number of different types of apparatus may be used to carry out the synthesis of diamond. One such apparatus is the so-called "belt" apparatus which forms the subject of U.S. Pat. No. 2,941,248 granted to Howard Tracey Hall and assigned to the General Electric Company. This apparatus consists essentially of an annular belt or die member having a tapering aperture therethrough and a pair of concentric frustoconical punches which are capable of moving into the aperture to define a reaction chamber therein. A suitable gasket material such as pyrophyllite is employed between the punches and die member for sealing purposes and over the inner surface of the die facing the reaction zone to insulate thermally this portion of the die. The temperature of the reaction chamber may be raised by connecting the punch members to a source of electrical power thereby creating a resistance heating circuit through the punches and the reactant materials in the reaction vessel.

Apart from the above-described method, other methods have been proposed for converting non-diamond into diamond. An example of another such method is disclosed in U.S. Pat. No. 3,488,153 granted to Francis P. Bundy and assigned to the General Electric Company. This method consists essentially in converting carbonaceous material into diamond in the absence of conventional metallic solvents for carbon by employing extremely high pressures and temperatures, e.g. pressures in excess of 120 kilobars and temperatures in excess of 3500° C.

In all the prior art methods of converting non-diamond carbon into diamond very onerous conditions are necessary which reduces the effective life of the apparatus used.

It has now been found, and this discovery forms the basis of the present invention, that if a novel class of starting carbon-containing compositions is used as the carbon source, it is possible to produce diamonds at very much lower temperatures and pressures than used in prior art methods.

According to the invention, a method of producing diamond includes the step of subjecting a carbon-containing composition substantially free from carbon-hydrogen covalent bonds, to conditions of temperature and pressure such as to cause decomposition of the composition to release carbon atoms or groups of carbon atoms and effect conversion of the released carbon atoms or groups of carbon atoms into diamond.

Further according to the invention, the method consists essentially in the steps of providing a reaction zone, placing a composition as defined above in the reaction zone, subjecting the composition to conditions of temperature and pressure such as to cause decomposition of the composition to release carbon atoms or groups of carbon atoms, maintaining the conditions to effect conversion of the released carbon atoms or groups of carbon atoms into diamond, releasing the pressure and allowing the temperature to return to substantially ambient temperature and recovering diamond from the contents of the reaction zone.

The conditions and starting composition may be so chosen that melting and decomposition of the composition occurs.

Certain halogenated compounds have been found to be particularly suitable compositions for the practice of the invention. These halogenated compounds are the hexahalobenzenes, having the formula $C_6(Hal)_6$, the hexahaloethanes having the formula $C_2(Hal)_6$ and the tetrahaloquinones having the formula $C_6O_2(Hal)_4$. In all these formulae Hal represents a halogen atom. In particular, the chloro-derivatives of these compounds, viz. hexachlorobenzene, hexachloroethane and tetrachloroquinone (chloranil) have been found to be most suitable.

When these halogenated compounds are used as the carbon source, a large amount of halogen gas is generated during decomposition and explosions may occur. To avoid explosions, it is preferable to provide a getter for the halogen gas. A suitable getter is an alkali or alkaline earth metal, particularly lithium.

It is generally accepted in the art that it is necessary for conditions in the diamond stable region, i.e. above the so-called Berman-Simon line, to prevail before diamond will be produced. A plot of the Berman-Simon line, taken from Berman and Simon, Zeit. f. Elektrochemie, 59, 355 (1955) is shown as line A in FIG. 1 of the accompanying drawing.

In this FIGURE, temperature in degrees centigrade is plotted along the abscissa and pressure in kilobars is plotted along the ordinate. In contradiction to these prior art teachings, it has surprisingly been found that, in the method of the invention, it is possible to produce diamond under conditions of temperature and pressure below the Berman-Simon line. Thus, it is possible to use considerably lower temperatures and pressures than is possible with prior art methods.

The actual conditions used can vary between wide limits. In general, however, temperatures in excess of 2000° C and pressures in excess of 100 kilobars will not be used. If desired, the method can be conducted in the presence of a conventional metallic solvent for carbon and under conditions of pressure and temperature such that the metal functions as a solvent.

If conditions above the Berman-Simon line are to be used, the composition is preferably brought to these conditions by raising the pressure rapidly to the desired value and then bringing the temperature gradually up, e.g. a rate of between 20° C and 30° C per minute, to the desired value. Line B on FIG. 1 illustrates an example of such a path. If the conditions to be used are below the Berman-Simon line, then a stepwise path, as illustrated for example by line C in FIG. 1, is preferably followed.

Any suitable high temperature/pressure apparatus capable of producing the temperatures and pressures required will be satisfactory. One such apparatus is the belt apparatus disclosed in Hall U.S. Pat. No. 2,941,248 mentioned above.

Examples illustrating the invention will now be described.

EXAMPLE 1

Hexachlorobenzene powder was compressed into discs and these discs and lithium discs were placed in an iron cup in an alternating arrangement, i.e. lithium disc, then a hexachlorobenzene disc, then a lithium disc and so on until the cup is full. The cup was wrapped in tantalum foil and placed in a high pressure capsule in a belt apparatus of the type described in Hall U.S. Pat. No. 2,941,248.

The apparatus was operated in the conventional manner to bring the pressure in the reaction zone rapidly to about 40 kilobars. Thereafter, the temperature of the reaction zone was raised gradually at a rate of about 20° C to 30° C per minute to a value of about 700° C. The elevated temperature and pressure conditions were maintained for between 15 to 30 minutes. The pressure was then released and the contents in the capsule allowed to cool to ambient temperature.

The contents were removed from the capsule and using conventional recovery techniques there was recovered from the contents a number of small crystals which were identified as diamond by X-ray analysis.

EXAMPLE 2

The same procedure as in Example 1 was followed except that a pyrophyllite cup was used and there were no lithium discs. The temperature and pressure conditions employed were 1600° C and 50 kilobars, respectively.

An examination of the contents of the capsule revealed a number of small crystals which were identified as diamond by X-ray analysis.

EXAMPLES 3 to 5

The same procedure as in Example 1 was adopted, except that the following temperature and pressure conditions were used:

| Example | Pressure (Kilobars) | Temperature (° C) |
|---------|---------------------|-------------------|
| 3 | 42.0 | 900 |
| 4 | 25.0 | 300 |
| 5 | 50.0 | 1150 |

In each case, crystals of diamond, identified by X-ray analysis, were recovered from the contents of the reaction capsule.

EXAMPLES 6 to 8

The same procedure as in Example 2 was adopted, except the following temperatures and pressure conditions were used and a stepwise path as illustrated by line C in FIG. 1 was followed in bringing the reaction zone to the specified conditions.

| Example | Pressure (Kilobars) | Temperature (° C) |
|---------|---------------------|-------------------|
| 6 | 25 | 800 |
| 7 | 30 | 1000 |
| 8 | 40 | 1100 |

In each case, crystals of diamond, identified by X-ray analysis, were recovered from the contents of the reaction capsule.

EXAMPLE 9

The same procedure as in Example 1 was adopted, except that the compound used was hexachloroethane and the temperature and pressure conditions employed were 900° C and 45 kilobars, respectively.

Crystals of diamond, identified by X-ray analysis, were recovered from the contents of the reaction capsule.

EXAMPLE 10

The same procedure as in Example 1 was adopted, except that the compound used was chloranil and the temperature and pressure conditions employed were 900° C and 45 kilobars, respectively.

Crystals of diamond, identified by X-ray analysis, were recovered from the contents of the reaction capsule.

Points representing the temperature and pressure conditions of each of the above-mentioned examples have been plotted on FIG. 1.

We claim:

1. A method of producing diamond including the step of subjecting a compound selected from the group consisting of hexachlorobenzene, hexachloroethane and tetrachloroquinone, to a temperature of 300° to 1150° C. and a pressure of 25 to 50 kilobars, said temperature and pressure being below the Berman-Simon line, for 15 to 30 minutes, and then releasing said pressure.

* * * * *